United States Patent
Yembari et al.

(10) Patent No.: US 12,204,943 B1
(45) Date of Patent: Jan. 21, 2025

(54) SYSTEM AND METHOD FOR DYNAMICALLY ALLOCATING COMPUTER RESOURCES TO A DATA PROCESSING PIPELINE

(71) Applicant: ZLURI TECHNOLOGIES PRIVATE LIMITED, Hyderabad (IN)

(72) Inventors: Chaithanya Yembari, Hyderabad (IN); Sethu Meenakshisundaram, Hyderabad (IN); Ritish Reddy, Hyderabad (IN); Chinmay Panda, Hyderabad (IN); Vanketesh Kumar, Hyderabad (IN); Deepanshu Agarwal, Hyderabad (IN); Tejaswini Jupudi, Hyderabad (IN)

(73) Assignee: ZLURI TECHNOLOGIES PRIVATE LIMITED, Hyderabad (IN)

( * ) Notice: Subject to any disclaimer, the term of this patent is extended or adjusted under 35 U.S.C. 154(b) by 0 days.

(21) Appl. No.: 18/370,015

(22) Filed: Sep. 19, 2023

(30) Foreign Application Priority Data

Jul. 20, 2023 (IN) .............................. 202341049064

(51) Int. Cl.
```
G06F 9/50      (2006.01)
G06F 8/41      (2018.01)
G06F 9/38      (2018.01)
G06F 9/54      (2006.01)
```
(52) U.S. Cl.
CPC .............. *G06F 9/5044* (2013.01); *G06F 9/38* (2013.01); *G06F 9/3838* (2013.01); *G06F 9/5038* (2013.01); *G06F 9/544* (2013.01); *G06F 8/433* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 10,671,443 B1* | 6/2020 | Ramachandran | G06F 9/541 |
| 2008/0112415 A1* | 5/2008 | Sobaje | H04L 47/2441 370/392 |
| 2012/0249564 A1* | 10/2012 | Liu | G06F 9/5016 345/530 |
| 2014/0223444 A1* | 8/2014 | Keeton | G06F 9/50 718/104 |
| 2015/0052236 A1* | 2/2015 | Friedrich | H04L 43/08 709/224 |
| 2017/0163492 A1* | 6/2017 | Khazanchi | H04L 67/10 |

(Continued)

FOREIGN PATENT DOCUMENTS

WO    2021000488 A1    1/2021

*Primary Examiner* — Abu Zar Ghaffari
(74) *Attorney, Agent, or Firm* — Shumaker, Loop & Kendrick, LLP

(57) ABSTRACT

A system and method for dynamically generating a data processing pipeline. A processor receives data including one or more data types from a data source. A set of sub-pipelines are created based on the one or more data types, wherein each sub-pipeline of the set of sub-pipelines includes one or more processing layers. Further, the one or more data types and volume of data assigned to each processing layer of the one or more processing layers is determined. Subsequently, the resource allocation to the one or more processing layers is done dynamically based on the one or more data types, the data source, and the volume of the data.

19 Claims, 9 Drawing Sheets

(56) References Cited

U.S. PATENT DOCUMENTS

| | | | |
|---|---|---|---|
| 2018/0129713 A1* | 5/2018 | Zhang | G06F 16/24568 |
| 2018/0260138 A1* | 9/2018 | Alapati | G06F 3/0653 |
| 2018/0329644 A1* | 11/2018 | Das | G06F 3/0604 |
| 2019/0065248 A1* | 2/2019 | Ravindran | G06F 9/485 |
| 2019/0163539 A1* | 5/2019 | Bishop | G06F 9/5083 |
| 2019/0268401 A1* | 8/2019 | Desai | H04L 49/9047 |
| 2019/0303743 A1* | 10/2019 | Venkataramani | G06F 9/52 |
| 2020/0356403 A1* | 11/2020 | Kasha | G06F 9/5038 |
| 2022/0043651 A1* | 2/2022 | Govindaraju | G06F 8/71 |
| 2022/0058173 A1 | 2/2022 | O'Farrell et al. | |
| 2022/0066813 A1 | 3/2022 | Taher et al. | |
| 2022/0269548 A1* | 8/2022 | Dwivedi | G06F 11/3006 |
| 2023/0142107 A1* | 5/2023 | Bladow | G06F 9/4881 709/240 |
| 2023/0230351 A1* | 7/2023 | Abdollahian Noghabi | G06N 3/0464 382/177 |
| 2023/0289241 A1* | 9/2023 | Gupta | G06F 9/52 718/107 |

* cited by examiner

SYSTEM AND METHOD FOR DYNAMICALLY ALLOCATING COMPUTER RESOURCES TO A DATA PROCESSING PIPELINE

PRIORITY INFORMATION

The present application claims priority from an Indian patent application Ser. No. 202341049064 dated 20 Jul. 2023 any other application.

TECHNICAL FIELD

The present subject matter described herein, in general, relates to a dynamic data processing pipeline, and more particularly relates to a technique of dynamic resource allocation for the dynamic data processing pipeline.

BACKGROUND

A data processing pipeline is a sequence of interconnected steps or stages that are designed to process and transform data in a structured and automated manner. Each of these series of steps or stages includes one or more processing layers. The processing layers of the data processing pipeline are responsible for performing compute and storage operations. The data processing pipeline moves data from its source to its destination while simultaneously applying a variety of operations and transformations at various points along the way. Data processing pipelines are essential for managing data and turning the raw data into insightful information. They boost productivity, maintain data quality, streamline the process, and give enterprises the ability to use data efficiently for analysis and decision-making. The conventional data processing pipelines are static in nature in terms of allocating resources for various types of data. Further, these types of data processing pipelines are not able to handle the data volume in an efficient manner due to a lack of scalability. Also, the resource allocation is not efficiently managed in the conventional data processing pipelines and, as a result, there are performance limitations. Therefore, there is a need for a dynamic processing pipeline in a cloud computing environment that can provide an optimal data processing performance for various applications.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for dynamically generating a data processing pipeline. This summary is not intended to identify essential features of the claimed subject matter, nor is it intended for use in determining or limiting the scope of the claimed subject matter.

In one implementation, a method for dynamically generating a data processing pipeline is disclosed. A processor receives incoming data including one or more data types from a data source. The processor creates a set of sub-pipelines based on the one or more data types. Further, each sub-pipeline of the set of sub-pipelines includes one or more processing layers. Furthermore, the processor determines a data type and a volume of data assigned for processing at each processing layer of the one or more processing layers. Subsequently, data processing resources are allocated dynamically to the one or more processing layers based on the one or more data types, the data source, and the volume of the data.

In another implementation, a computer programmable product embodying a computer program executable in a computing device is disclosed. The computer program dynamically generates a data processing pipeline. The computer programmable product stores instructions to receive incoming data, including one or more data types from a data source. A set of sub-pipelines are created based on the one or more data types. Further, each sub-pipeline of the set of sub-pipelines includes one or more processing layers. Furthermore, a data type and a volume of data assigned for processing is determined at each processing layer of the one or more processing layers. Subsequently, data processing resources are allocated dynamically to the one or more processing layers based on the one or more data types, the data source, and the volume of the data.

In one aspect, the aforementioned method for dynamically generating a data processing pipeline may be performed by a processor using programmed instructions stored in a memory.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures; however, the invention is not limited to the specific systems and methods for dynamically generating a data processing pipeline disclosed in the document and the figures.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "determining," "allocating," "assigning," "identifying," "creating", and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art, and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for dynamically generating a data processing pipeline. Particularly, the invention discloses dynamic resource allocation in a data processing pipeline. The data processing pipeline generally includes three stages: an input stage, a data processing stage, and an output stage. The input stage includes collecting data from a data source via various data collecting platforms to provide input data for the data processing. With the advent of big data, a massive volume of data is being collected from a variety of devices and applications. For example, when a software application is used by a user, the various insights of application usage, such as login and log out time, frequency of logins, duration of usage, etc., may be collected by using a variety of techniques. The application usage can be tracked using direct application integrations or using Application programming interface (API) integrations, or through Single Sign On (SSO) integration. The data collected from the variety of techniques is in different formats and varies in size as well. As a result, a data processing pipeline that may handle this variety of data types from different sources and varying volumes is required.

Figure 1:
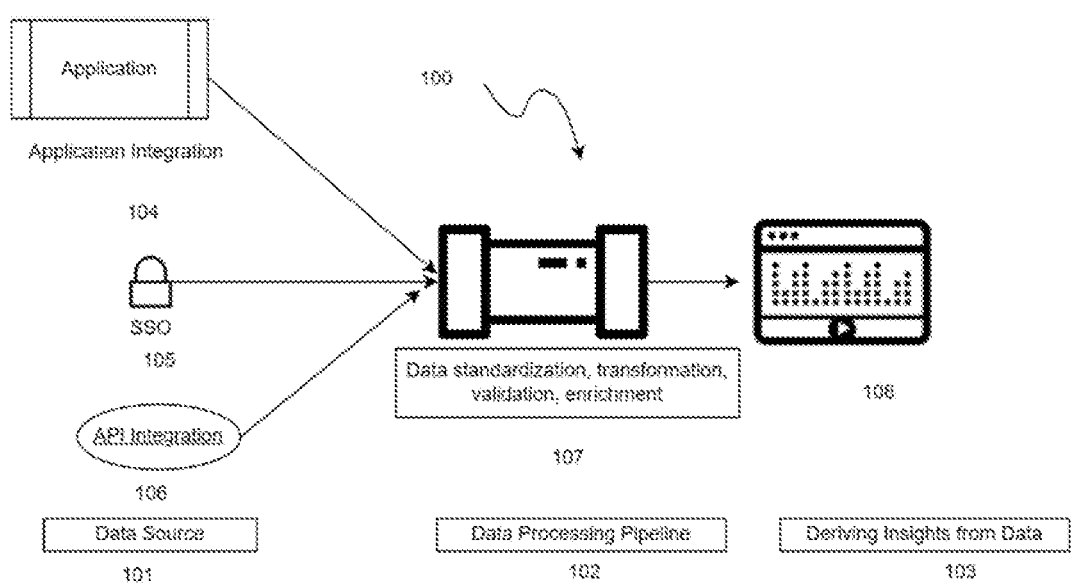
FIG. 1 illustrates a general data processing pipeline workflow, in accordance with an embodiment of the present subject matter.

FIG. 1 illustrates a general data processing workflow 100. The raw data related to one or more applications is fetched from a data source 101 via various platforms, for example, via various integrations such as SSO integration 105, Application Integration 104, and API Integration 106. Subsequently, the collected data is fed to the data processing pipeline 102. At the data processing pipeline 102, various data processing operations take place, for example, as mentioned in data processing block 107. The various data processing operations, such as data standardization, data transformation, data validation, and data enrichment, are performed to convert the raw data into meaningful data. Further, the insights are derived from this meaningful data to take decisions, including some key business decisions. The insights and further analysis may be presented to a user, for example, through a user interface 108, at stage 103 of the data processing operation. The data processing pipeline 102 may include a number of sub-pipelines and a variety of processing layers to perform a variety of operations on data obtained from various sources. The incoming data from the various sources varies from time to time. For example, the type of data may vary, and the volume of incoming data that needs to be processed would vary and, as a result, the processing requirements such as hardware specifications, number of processing cores, and memory requirements would also vary. Therefore, the processing layers to process such dynamic requirements may need a dynamic resource allocation.

Figure 2:
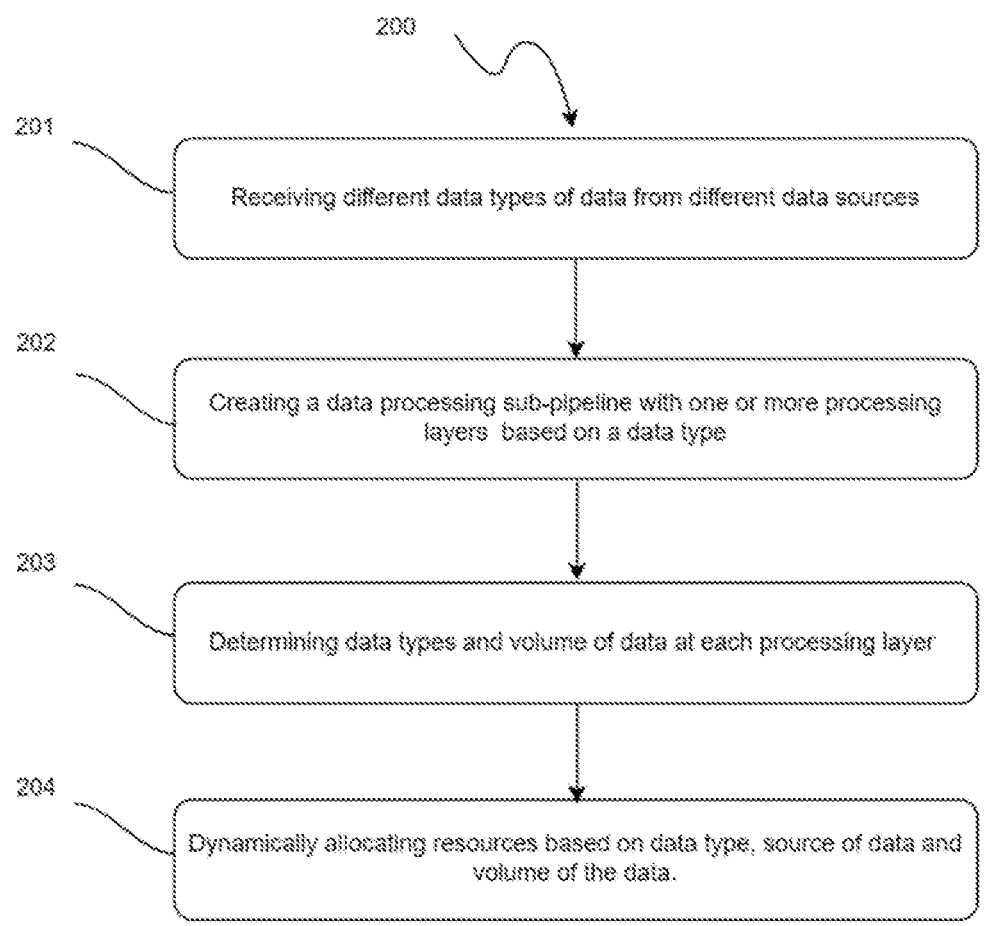
FIG. 2 illustrates a method for dynamically generating a data processing pipeline, in accordance with an embodiment of the present subject matter.

As shown in FIG. 2, a method 200 for dynamically generating a data processing pipeline is disclosed. At step 201, one or more data types are received by the processor of a computing system. The one or more data types are received from a data source 101, for example, a Zoom® Application, Slack® application or Google Workspace®, etc. The data source 101 may provide data via various platforms such as Application integration, Single Sign On (SSO) integration, and Application programming interface (API) platform to collect variety of user data and application data.

The collected data includes different data types and different volume or size. For example, the data types could be an application state data and a time interval-based application data. The application state data can encompass various types of information, depending on the nature of the application and its requirements. Some common examples of application state data include user session information, application configuration settings, workflow or process-related information, queues, users, and user messaging, etc. Similarly, the time interval-based application data may include specific data associated with timestamps or time intervals in the context of application usage, for example, event logs, time-series data, streaming data, etc.

At step 202, a data processing sub-pipeline with one or more processing layers is created based on the data type. For example, a sub-pipeline may be created to process specific data types. The sub-pipeline may include one or more processing layers, each processing layer handling different data processing and storage operations. For instance, in the case of the Slack® application, it may generate various types of data such as data related to one or more users, channel data, message data, and user reaction data. The channel data may include one or more channels data for data processing. Similarly, message data and user reaction data may include one or more user message and reaction data for the data processing. Each of the data types may be processed at separate sub-pipelines, as will be discussed later.

At step 203, the data type and volume of data assigned is determined at each processing layer. For example, in the case of the Slack application data, at a first sub-pipeline, the data type may be user data and a volume of 100 Gigabyte (GB) may be preliminarily processed at the first processing layer. The user data may be related to one or more groups or channels. The second processing layer of the first sub-pipeline may receive processed data of volume 40 GB from the first processing layer for further processing. Hence, at the second processing layer, the data type may remain user data. However, the volume may reduce to 40 GB, and the type of processing to be performed may be more complex than that performed at the first processing layer. Hence, the type and number of resources to be allocated to the second processing layer may differ from those allocated to the first processing layer in the same sub-pipeline, i.e., the first sub-pipeline.

In another example, at a second sub-pipeline, the data type may be channel data, and a volume of 50 GB may be processed at the first processing layer of the second processing layer. The channel data is related to one or more channels related to one or more users of the Slack® application. However, it may be determined that the channel data has to be processed with processed user data received from the first processing layer of the first sub-pipeline. Hence, at the first processing layer of the second sub-pipeline, the data type to be processed may be both channel data and user data, and the volume of data to be processed may be 90 GB (50 GB of channels data and 40 GB of preliminarily processed user data).

At step 204, data processing resources are allocated for each processing layer based on the determined data type, volume of the data, and source of the data. For example, the source of the data is the Slack® application. The Slack® application usage data may be obtained via various platforms such as SSO integration, API integration, and direct application integration. The resource allocation for processing the Slack® application data is done in a dynamic manner based on the data type and the volume of data being processed. In one embodiment, a specific type of resource is allocated at each processing layer considering the above three factors. For instance, some of the processing layers may have compute intensive resource requirements. A compute intensive processing task may need high processing power therefore high processing power servers would be allocated to a specific processing layer. Similarly, if a processing layer requires a memory intensive task, a high cache capability resource would be allocated. The resource allocation is dynamic in nature such that the processing layers are allocated specific types of resources based on data processing or task to be executed at each processing layer. In one embodiment, a resource type could be either compute heavy resources or memory intensive resources. For example, when a processing layer performs a complex computation on a large data set, such as handling various computations simultaneously on a large volume of data, a server with a higher number of processor cores and high processor speed would be required. Similarly, when a data processing layer performs memory intensive processing such as performing image processing such as resizing, filtering, and cropping on a large number of image files in memory. The loading and manipulation of large image files in memory during processing are memory-intensive, as the images need to be stored and accessed for transformations. In this scenario, the servers with high cache memory are allocated at respective processing layers.

Further, the data source may also be responsible for determining the resource type being allocated at each processing layer. For example, a real time gaming or monitoring applications would require low latency and highly responsive resources. In another scenario where a web application serves user requests over the internet, in this case, the complexity of the application logic being run by the application server would be responsible for determining the resource requirements for application data processing. Therefore, data sources such as a type of application would determine the type of resources being allocated. The resource type is determined based on parameters like computational needs, storage capacity, network performance, and latency considerations. For example, the resource allocation for data processing of the Slack® application would be different from the Google Workspace® application. The number of data processing layers may also vary on each processing sub-pipeline based on the data type being processed in the current sub-pipeline.

The data processing pipeline is thus created on the fly based on the incoming data type and volume. For example, for data processing, a set of sub-pipelines may be created, and at each sub-pipeline, a number of processing layers would be allocated. The number of processing layers may vary based on incoming data types. Further, the number and type of resources allocated at each processing layer depend on the data type to be processed, the volume of data to be processed, and the source of data. By dynamically allocating resources at the processing layer level rather than at the pipeline or sub-pipeline level, resources are better utilized, and idle time of resources is reduced. Further, once the processing is completed at a particular processing layer, those resources can be freed up and reallocated to a subsequent processing layer (of any sub-pipeline), rather than waiting for the complete processing in a sub-pipeline to finish to free up the resource. This thus results in more granular control and greater efficiency of resource allocation. Further, this kind of resource allocation ensures that resources are not wasted. Furthermore, avoids unnecessary costs associated with maintaining excess resources. The resources at processing layers are scaled up or scaled down based on demand fluctuations.

Additionally, dynamically allocating resources enables to maintain optimal performance levels. For example, resources can be allocated to high-priority tasks or processes, ensuring timely execution also prevent resource bottlenecks by redistributing underutilized resources to areas with higher demand. Also, the dynamic resource allocation method allows to capture insights into resource usage patterns and demand trends, which can be translated into an evidence-based system to predict future resource pool requirements to meet demands.

Further, the method 200, also includes a configuration file describing various aspects of the data processing pipeline, such as a number of sub-pipelines based on data types, order of execution of sub-pipelines, and processing layers. Further, the configuration file may include a validation script to validate several processes of the data processing pipeline. The configuration file may also include details of a self-recovery mechanism in case a failure is detected.

Figure 3A:
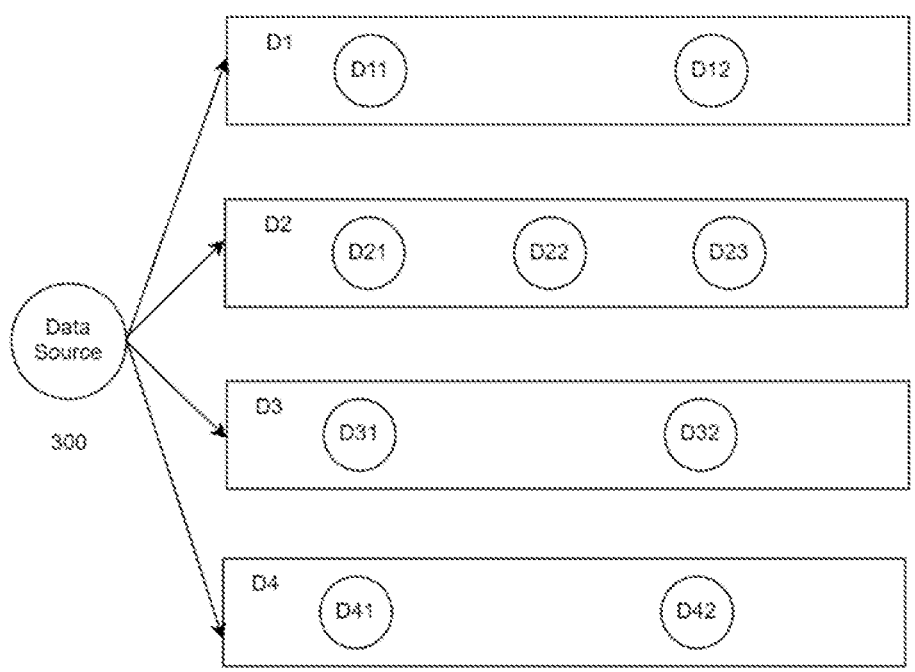
FIG. 3a illustrates a data processing pipeline generated dynamically, in accordance with an embodiment of the present subject matter.

As shown in FIG. 3a, a data processing pipeline is created in a dynamic manner. Firstly, data is received from a data source 300 through various platforms such as SSO integration, API integration, and direct application integration. A data source 300, for instance, may be a software application. A number of data types of the data source is identified, and then automatically the number of sub-pipelines are generated, such as D1, D2, D3, and D4. Further, each processing sub-pipeline includes multiple processing layers for example, at D1, there are two processing layers, D11 and D12. Similarly, at D2, D3 and D4 the processing layers are D21, D22, D23, and D31, D32 and D41 and D42 respectively. The number of processing layers at each processing sub-pipeline may vary based on the incoming data type, volume, and the processing requirements. Further, the resource allocation at each processing layer is done based on one or more factors like the incoming volume of the data, type of the data, and also based on the data source, such as the software application whose data is being processed. Furthermore, the number of processing layers at each sub-pipeline may vary based on the above-mentioned factors.

For example, in the case of the Slack® application, the data for different processing sub-pipelines include user data, channel data, message data, and user reaction data. Therefore, at D1 processing sub-pipeline the raw user data is being processed, and therefore, resources would be allocated accordingly. For example, if raw data of 100,000 users is being processed at D11 processing layer and therefore may be 100 servers would be allocated to process this data. Subsequently, when the processed raw data is being fed to D12 processing layer, the number of resources might not be same at this stage as the processing requirements are different now. Therefore, at layer two of D1 sub-pipeline, that is D12, the type of servers may be less computationally heavy, unlike at D11. However, in order to perform the processing faster at D12, the number of servers deployed would be more than that were deployed D11. For example, at D11, 100 servers with higher computation power would be deployed, and at D12, 200 servers with relatively lesser computation power may be deployed. Hence, the resource allocation at each processing layer is highly dynamic in nature. The feature of dynamically allocating resources at each processing layer results in resource utilization at more granular level.

Referring again to the Slack application, the data processing pipeline would include four sub-pipelines D1, D2, D3, and D4. In one embodiment at each processing sub-pipeline, a different data type is being processed. The Slack application data may be obtained in JavaScript Object Notation (JSON) format.

The data obtained from a data source 300 may be processed in any combination of serial and parallel processing at the different processing layers across sub-pipelines based on the dependency of different types of data at each processing sub-pipeline. For example, processing layers of D1 sub-pipeline and D2 sub-pipeline may be executed in a serial manner while processing layers of D3 and D4 sub-pipelines may be executed in a parallel manner. In the above example for the Slack® application, the user data may be processed at D1, channel data may be processed at D2, message data may be processed at D3, and user reaction data may be processed at D4. Further, based on the data processing dependencies, the order of execution of processing layers of the sub-pipelines D1, D2, D3, and D4 is determined.

Data processing operations at each processing layers, for example at D11 and D12 of D1 processing sub-pipeline may vary. In case of Slack application, the data standardization or normalization may take place at D11 processing layer. After completion of the data pre-processing at D11 processing layer, the data processing layer D12 is created dynamically at D1 processing sub-pipeline. At D12 processing layer, the pre-processed data from D11 processing layer is first compared from the database and new entries of the data would be determined. For instance, the normalized or standardized data from the D11 processing layer would be compared with the current data present on the database and new users or entries would be determined for processing at D12 processing layer. For example, if 20 new users are added based on the comparison results at D11, a separate processing layer would be allocated on the fly to process the new data. Similarly, if 30 users or entries are deleted from the database, a separate processing layer would be allocated on the fly to remove the processing of details these users or entries. All the corresponding processes and methods should be removed for these removed entries or users. Additionally, based on the outcome of the difference or comparison operation a new set of processing layers are created in the real time to handle the processing of new data for example D12 processing layer. In general, at each data processing sub-pipeline such as D1, D2, D3, and D4 as and when required new processing layers may be formed in the real time to cater the processing requirement of the data processing sub-pipeline. The processing layer include appropriate resources to process the incoming data at each layer.

Further, the resource requirement at each processing layer may vary based on the data type and data volume being processing. For example, in an application data with millions of rows including data entries may require a server with high processing power. The processing power of the server may be increased by adding multiple processor cores to the server. In another example, for a Slack application when channel data is processed then the amount of data to be processed might not be very high and hence a server with lesser number of cores would suffice to perform the channel data processing for the Slack application. At each processing layer of sub-pipeline, based on the requirement for data processing the appropriate processing resources are allocated. For example, in case of Slack application, the allocation of resources at each processing layer handling user data, channel data, message data, and user reaction data would be done dynamically. Based on the data type handled at each processing layer the type of resource is being allocated. In the case of the Slack® application, user' data processing at D1 processing sub-pipeline might need to require server with 50 cores, while at D2 processing sub-pipeline stage might need a server with 20 cores based on the amount and type of data to be processed. Similarly, for the channel data at D2 processing sub-pipeline at each processing layer, such as D21, D22, and D23, the resource allocation is done dynamically on the fly. Similarly, the same approach would be applied for resource allocation at each processing layer for message data and user reaction data processing layers at D3 and D4 processing sub-pipelines.

Subsequently, for the data processing pipeline, the processed data may be analysed based on the enriched data obtained from multiple sub-pipelines and corresponding processing layers. For example, in the Slack® application, user engagement analysis may be done, usage patterns of the application, network analysis such as connections, community, sentiment analysis etc might be performed. Hence, resources are allocated accordingly to derive insights and perform certain actions on the processed data. Subsequently, reports may be generated to show some visuals or graphs based on the analysis performed. Therefore, resource allocation at this processing layer could be a Graphics processing unit (GPU) accelerator-based server for optimal performance. Also, the number of processing layers may depend on a number of unique reports or insights that needs to be derived based on the available data.

In one example, the data processing operation of each sub-pipeline is defined in a configuration file. The configuration file may define the number of processing layers required at each sub-pipeline. The configuration file may also include different types of data for a data source. The data processing pipeline is defined via processing templates; these templates are defined in the configuration file. The configuration file may include a sequence of data processing, input and output parameters, resource types, and capabilities such as server capabilities. The configuration file further defines the order of execution of templates that could be either parallel or serial, or a combination of both. In one embodiment, the IT administrator may create a configuration file. Alternatively, the system may generate the configuration file based on the source type, like a software application whose data is to be processed on the data processing pipeline. In another embodiment, the configuration file may be generated automatically based on previously generated configuration files for the similar software applications. The configuration file helps in the generation of a dynamic processing pipeline by enabling resource allocation at processing layers, without making changes at the system level. Basically, the configuration file defines the processing requirement as per data type at each sub-pipeline, and hence resources are managed at a more granular level of each sub-pipeline that is at each processing layer. Therefore, whenever a new application or data source comes in whose data needs to be processed, the modifications are done on the configuration file to create the required number of sub-pipelines as per the data types. Furthermore, at each sub-pipeline, dynamically allocating resources at each processing layer results in removing the requirement of system level changes while resource allocations for data processing.

Figure 3B:
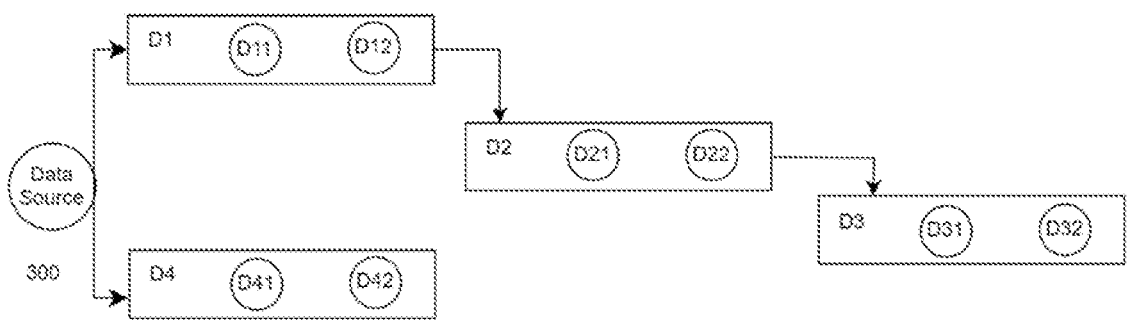
FIG. 3b illustrates an order of execution of data processing sub-pipelines generated dynamically, in accordance with an embodiment of the present subject matter.

The order of execution of data processing layers is defined in the configuration file based on data dependency. For instance, in the case of a Slack® application, different data types include user data, channel data, message data, and user reaction data. As shown in FIG. 3b, an exemplary embodiment for order of execution of the processing of the Slack application data. There are four processing sub-pipelines D1, D2, D3 and D4. As it can be observed that D1 and D4 sub-pipelines are executed in parallel, while D2 is only executed after processing D1 and D4 is executed only after processing D3. In other words, D2 sub-pipeline takes input as output from D1 sub-pipeline and D3 sub-pipeline takes input from D2 sub-pipeline. At D1 sub-pipeline user data is being processed, while at D2 channel data and at D3 message data is being processed. At D4 sub-pipeline the user reaction data is being processed.

In an example, the Slack® application channel that are D2 sub-pipeline cannot be processed without processing user data that is D1 sub-processing pipeline as its impossible to identify the users of the channel if user data is not processed first. Therefore, user data is processed first, and then channel data is processed. Similarly, message data that is D3 sub-pipeline cannot be executed without processing both user and channel data. However, for processing user reaction data that is D4 sub-pipeline for example, emojis shared by different users, this user reaction data may be processed in parallel along with user data that is D1 sub-pipeline as they are not dependent on each other. In the case of user reaction data, simply different reactions are analysed without taking into account the exact user behind the specific reaction. This analysis may be done to understand the overall sentiments of users. The processed user reaction may be later merged or tagged with specific users once it's being processed. In alternate embodiment, the metadata associated with the data may be analysed to decide an order of the execution of the various data types at each processing layer. Therefore, the orchestration of the sub-pipelines and corresponding resources is done based on the dependencies of the data for data processing.

Figure 3C:
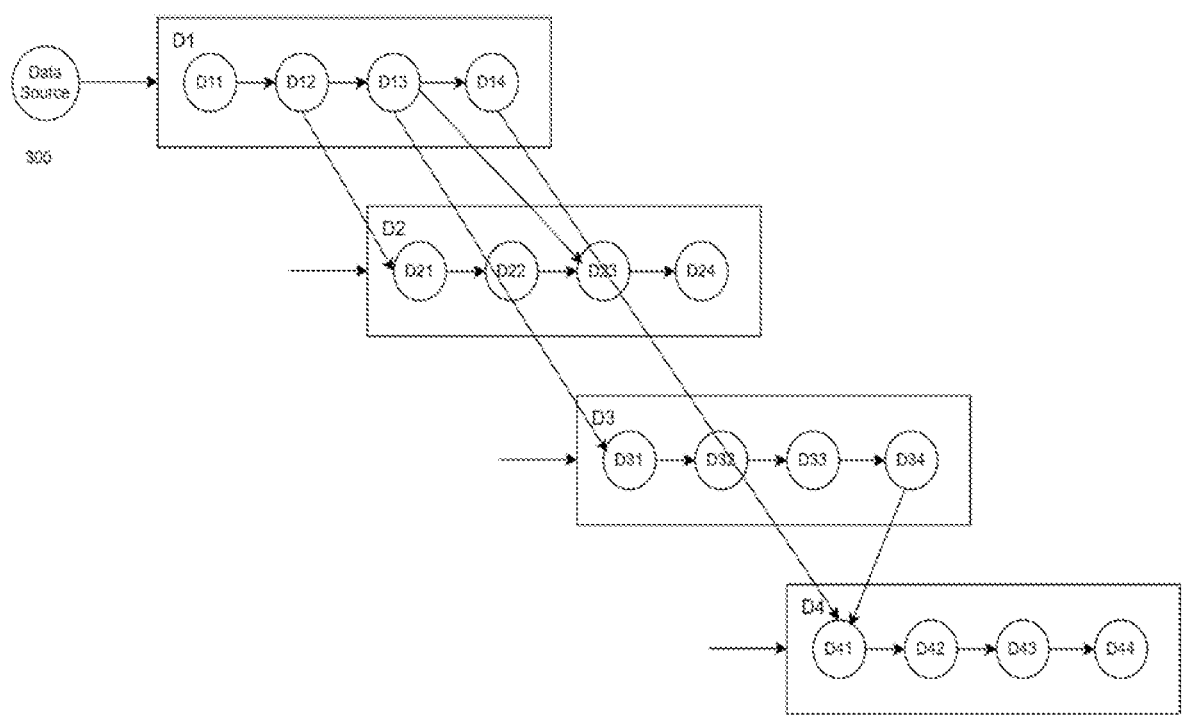
FIG. 3c illustrates another order of execution of data processing sub-pipelines generated dynamically, in accordance with an embodiment of the present subject matter.

In another embodiment, as illustrated in FIG. 3c, the order of execution of the data processing pipeline may vary at different processing layers level. For example, in FIG. 3c, the output of processing layer D12 is fed to D21, and the output of D13 processing layer is fed to the D31 hence this execution of data processing operations is in a serial manner. Further, the data processing at D13 and at D21 processing layer may happen in a parallel manner, basically, D13 and D21 are not dependent on each other therefore, the processing sub-pipeline D2 may already start processing data while D1 is somewhere mid-way through data processing at D1 sub-pipeline. Similarly, the processing of D31 and D41 starts after the completion of data processing at D13 and D14 processing layers. Further, after the completion of D14 and D34, the D4 processing sub-pipeline may be started. Since there is no dependency of D2 processing sub-pipeline on D4 processing sub-pipeline so it can execute in parallel. In other words, the data processing at D4 sub-pipeline is started without the completion of data processing at the D2 sub-pipeline. Therefore, the order of execution at each processing layer at each sub-pipeline is a combination of serial and parallel processing based on the data dependencies basis application or data source type.

Based on the identified dependency for different data types of particular data sources or an application, the processing layers at each sub-pipeline are created in any combination of serial or parallel for execution. Independent processing layers may be created in a parallel manner where data processing of different data types may be done independently. The orchestration of the sub-pipelines is based on the dependencies at each processing layer and is defined in the configuration file. For a data source such as a software application, the configuration file may include various types of data that need to be processed, the dependencies between data types for processing either in a serial or a parallel manner, the number of processing layers, etc. For example, disjoint or independent data types can be processed in a parallel manner while, if the output of the previous stage data processing is dependent or fed to the subsequent processing layer, then the data is processed in a serial manner.

The resources for the processing layers are allocated on the fly based on the requirements of the data processing sub-pipeline. A resource could be a server in a cloud computing environment. In another embodiment, it could be a bare metal server. Alternatively, it could be a combination of both. Furthermore, a type of resource is also determined based on the identified data type and volume of the data; for example, a processor may be chosen based on its processing speed or number of cores or RAM capacity, or based on storage type. Further, the resource type may also be chosen based on its networking capabilities. By allocating optimum resources at each processing layer of the data processing pipeline a time optimization for data processing is achieved. Additionally, the resources are freed up for example, after completing the processing at a particular processing layer, the resources are available for allocation to other required processing layers. In this manner, the resources are not tied up to the particular processing layers, also the processing speed of the system increases. In one of the embodiments, different types of servers are allocated to the processing layers based on the data type and volume of the data to be processed.

The data processing pipeline also includes self-healing mechanisms in case of a fault occurs during data processing. For example, an auto resume feature may be defined in the configuration file. While processing multiple files simultaneously, if a failure occurs during processing for a particular file, then the data processing is resumed from that specific file itself rather than restarting the entire data processing. The auto resume feature may be implemented using a snapshot technique. With this technique, the state of the data processing is routinely captured at certain checkpoints or intervals, enabling recovery and continuation of the operation in the event of errors or failures. The method also implements error correction techniques to self-heal the errors during data processing. For example, if the error is related to data quality, then a data cleansing operation can be performed, or if the error is transient, then a retry operation is also recommended. In some cases, configuration-related errors may occur, so adjusting the configuration settings, and updating dependencies can help resolve such errors.

In one example, the configuration file may include a validation script to validate the various aspects of the data processing pipeline. The validation script run checks and tests to confirm that the data processing pipeline is working properly and generating the intended results. The validation script may be generated for input data validation, data transformation validation, error handling validation, performance validation, etc. Overall, the validation scripts serve the purpose of ensuring the quality, integrity, and correctness of the data being processed. The specific validation requirements depend on the data type, the processing tasks involved, and the desired data quality objectives.

Figure 4A:
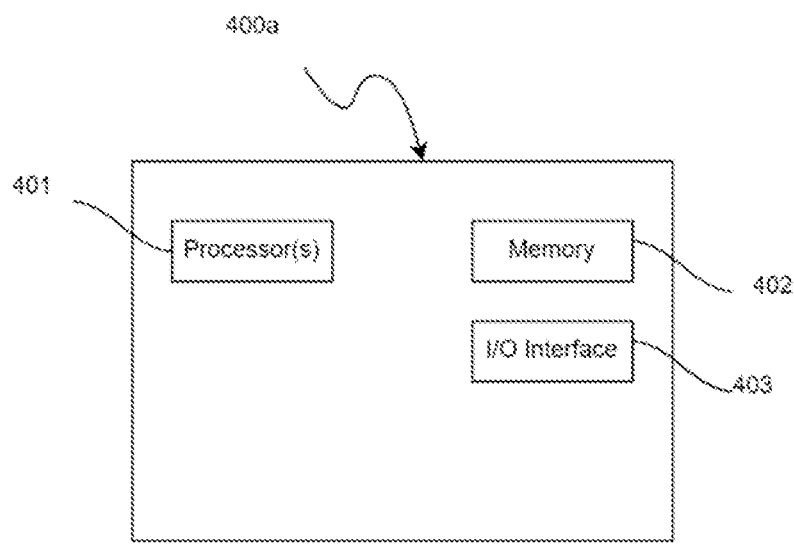
FIG. 4a illustrates a system for implementing a dynamic data processing pipeline, in accordance with an embodiment of the present subject matter.

Referring to FIG. 4a, a system implementation for dynamically generating the data processing pipeline is disclosed. In an embodiment, a system 400a implemented as a server receives data associated with a software application. Although the present disclosure is explained considering that the system 400a is implemented on a server, it may be understood that the server may be implemented in a variety of computing systems, such as a laptop computer, a desktop computer, a notebook, a workstation, a virtual environment, a mainframe computer, a server, a network server, a cloud-based computing environment.

In one embodiment, the system 400a may include at least one processor 401, an input/output (I/O) interface 403, and a memory 402. The at least one processor 401 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 401 is configured to fetch and execute computer-readable instructions stored in the memory 402.

The I/O interface 403 may include a variety of software and hardware interfaces, for example, a web interface, a graphical user interface, and the like. The I/O interface 403 may allow the system 400a to interact with the outside world to receive the data from multiple data sources. Further, the I/O interface 403 may enable the system 400a to communicate with other computing devices, such as web servers and external data servers (not shown). The I/O interface 403 can facilitate multiple communications within a wide variety of networks and protocol types, including wired networks, for example, LAN, cable, etc., and wireless networks, such as WLAN, cellular, or satellite. The I/O interface 403 may include one or more ports for connecting a number of devices to one another or to another server.

The memory 402 may include any computer-readable medium or computer program product known in the art including, for example, volatile memory, such as static random-access memory (SRAM) and dynamic random access memory (DRAM), and/or non-volatile memory, such as read-only memory (ROM), erasable programmable ROM, flash memories, hard disks, Solid State Disks (SSD), optical disks, and magnetic tapes. The memory 402 may include routines, programs, objects, components, data structures, etc., which perform particular tasks or implement particular abstract data types. The memory 402 may include programs or coded instructions that supplement applications and functions of the system 400a. In one embodiment, the memory 402, amongst other things, serves as a repository for storing data processed, received, and generated by one or more of the programs or the coded instructions.

Figure 4B:
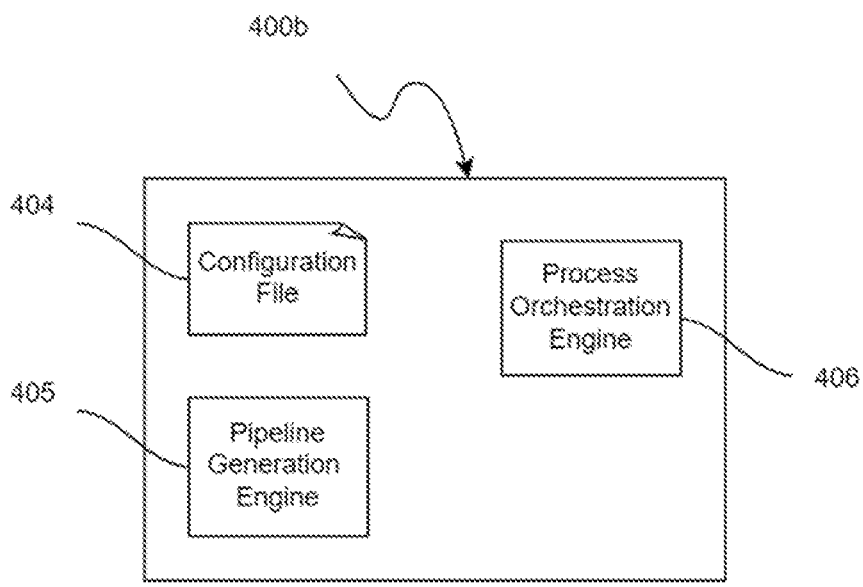
FIG. 4b illustrates processing logic of a system for implementing a dynamic data processing pipeline, in accordance with an embodiment of the present subject matter.

Referring to the FIG. 4b, the system 400b may include a configuration file 404, pipeline generation engine 405, and a process orchestration engine 406. The system 400b indicates various processing logics implemented on the system 400a. The configuration file 404 includes a description of various aspects of the data processing pipeline. For example, the configuration file 404 may describe the number of sub-pipelines required based on data types for a software application, an order of execution of sub-pipelines, and also an order of execution of the processing layers at each sub-pipeline. Further, the configuration file may also include a validation script to validate several processes of the data processing pipeline. Furthermore, the configuration file may also include details of a self-recovery mechanism in case a failure is detected. The pipeline generation engine 405 is responsible for the generation of the sub-pipelines as described in the configuration file. For example, as shown in FIG. 3a, the sub-pipelines D1, D2, D3, and D4 and created after obtaining details of different types of data from the configuration file 404. Subsequently, the process orchestration engine 406 is responsible for the allocation of data processing resources based on the dependencies of data processing operations as obtained from the configuration file 404. For example, as shown in FIG. 3b, the order of execution of different sub-pipelines is a combination of both serial and parallel therefore, the resource allocations at each sub-pipeline and at each processing layer are done by the process orchestration engine 406. The different types of resources, like server types and memory size of the resources, are allocated by the process orchestration engine 406. The configuration file 404 may include relevant information of the pipeline generation engine 405 and process orchestration engine 406 to run the entire system 400a.

The system 400a fetches, processes, analyses, and derives insights from software application data obtained via multiple platforms. The dynamic data processing pipeline normalizes different data formats, structures, and volumes. The software application data may include various entities, for example, users, licenses, applications, application users, tokens, activities (sign in/sign out, calls, messages), groups, channels, group members, transactions, departments, roles, etc. Each of these entities has different keys for different integration platforms, such as SSO integration and direct application integration. Therefore, for each entity, there are multiple keys, and cumulative keys are manifold based on a number of integrations. The data is being fetched at different intervals from different integrations, and a volume of data may depend on the size of an organization.

The system 400a generates data processing logic on the fly instead of writing it for each application. Therefore, depending on the type of data to be processed, the keys present in the data, the source of data, etc., a data processing logic is generated. The data type and volume of data assigned to each processing layer is determined in real time. To build a dynamic processing pipeline, generic templates are created to process data file components rather than entire data files. For example, by normalizing the keys for entities obtained from various data sources, a unique key entity pair is generated. Subsequently, the collection and processing at each processing layer is done using the unique key-entity pair, and hence resource allocation at each sub-pipeline is done dynamically.

The dynamically allocating resources results in optimal resource allocation such that dedicated servers are not allocated at pipelines; rather, based on the data volume and data type, a specific server is allocated to each processing layer. Servers may be spun off and removed as per the real-time data processing requirements. Further, atomic processing and validation of data are done while data is being processed in parallel and obtained from multiple platforms. The atomic processing ensures operation is performed in the form of single indivisible task. In atomic processing, the entire processing is completed first, and then the database is updated. Furthermore, the data is validated prior to saving on the database.

In an embodiment, the processing layers may include pods. The simplest fundamental deployment unit in a container orchestration system is called a pod. It represents one instance of a process that is currently operating in a cluster. One or more containers, storage resources, and network resources that are scheduled and controlled together can be contained within the pod. An auto scale function may be used for scaling up and down the resources. The auto scale function monitors the resource utilization of data processing layers and adds or removes replicas as needed to keep utilization within the desired range. Furthermore, the resource quota is also defined for each processing layer as it prevents the resource contention and ensures that cluster of resources are used efficiently. Additionally, any error in the data processing is handled using the auto resume feature.

In an embodiment, an error recovery feature restarts a process from the point where it stopped after running into an error. A persistent storage system may be used to keep track of the process's development at every stage. The persistent storage system, such as a database or file system, may be used to save the progress a process has made so far if it encounters an error while processing data. By doing this, the system can continue where it left off if it needs to be restarted without losing any work. This makes it more likely that data processing will succeed even if there are unanticipated faults or disruptions.

Figure 5A:
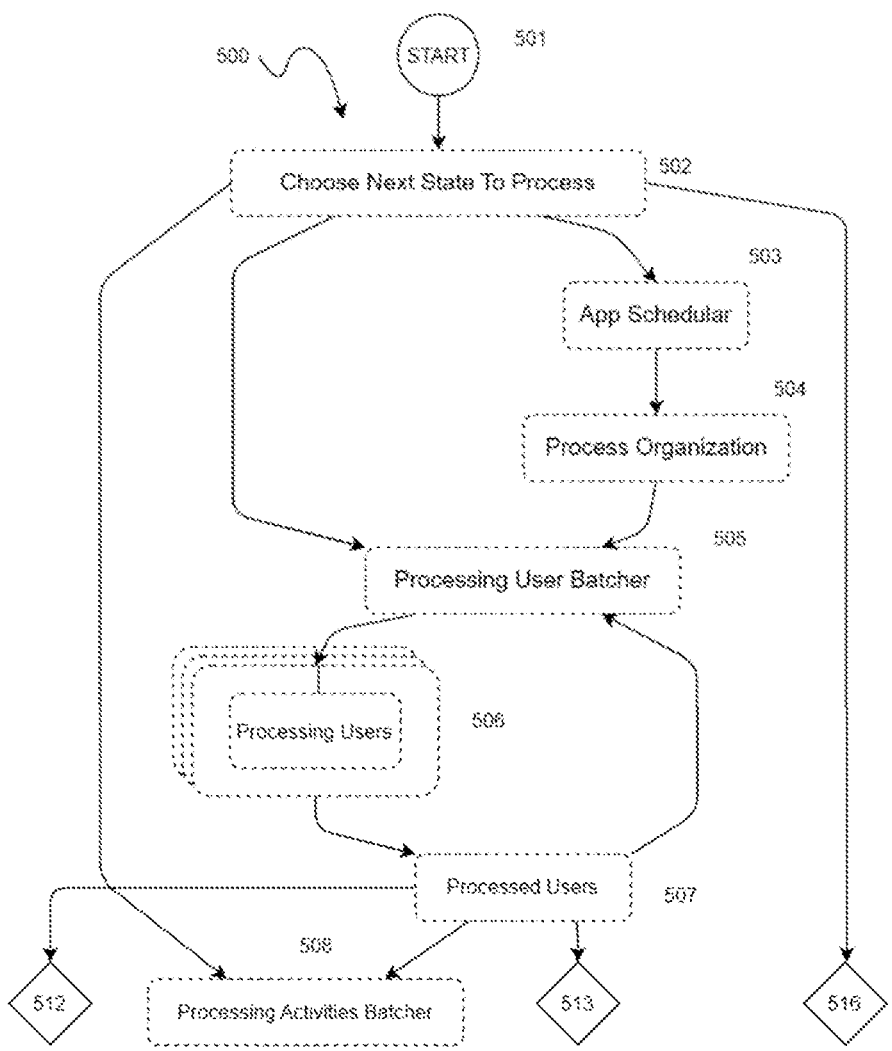
FIG. 5a-5c illustrates various steps involved for application data processing in a data processing pipeline, in accordance with an embodiment of the present subject matter.
Figure 5B:
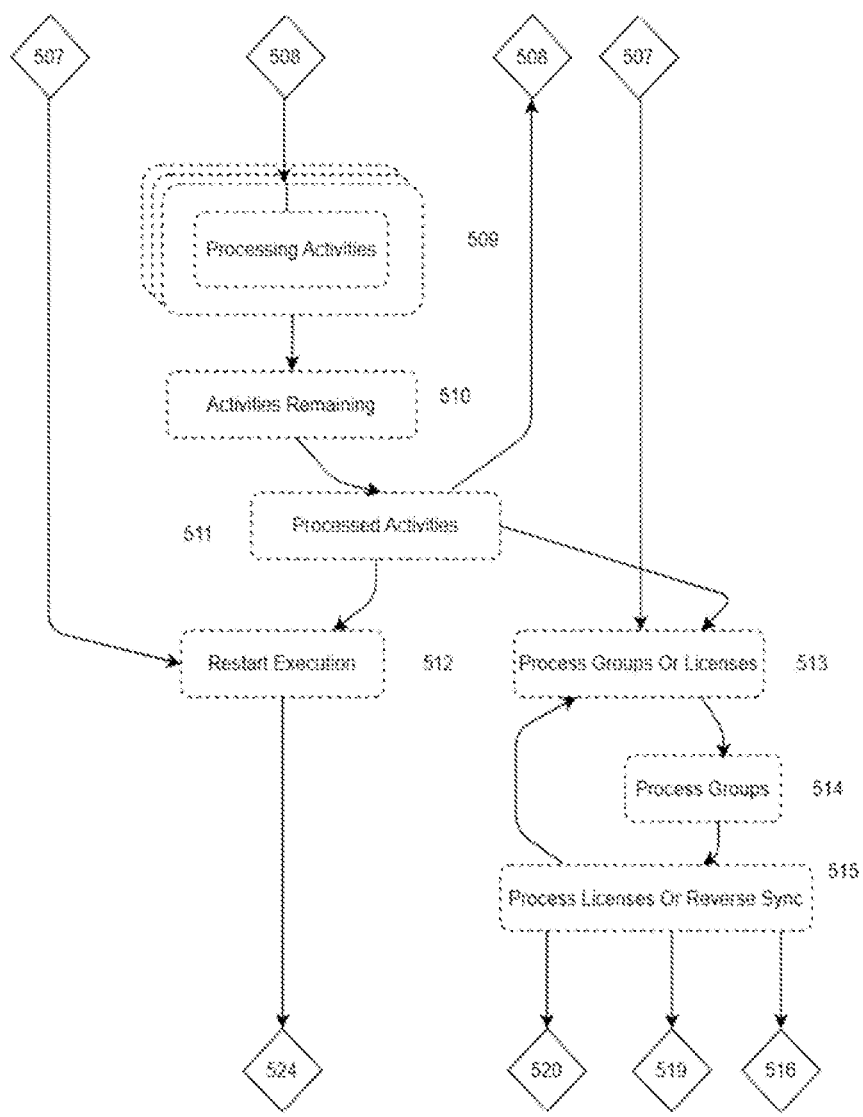
Figure 5C:
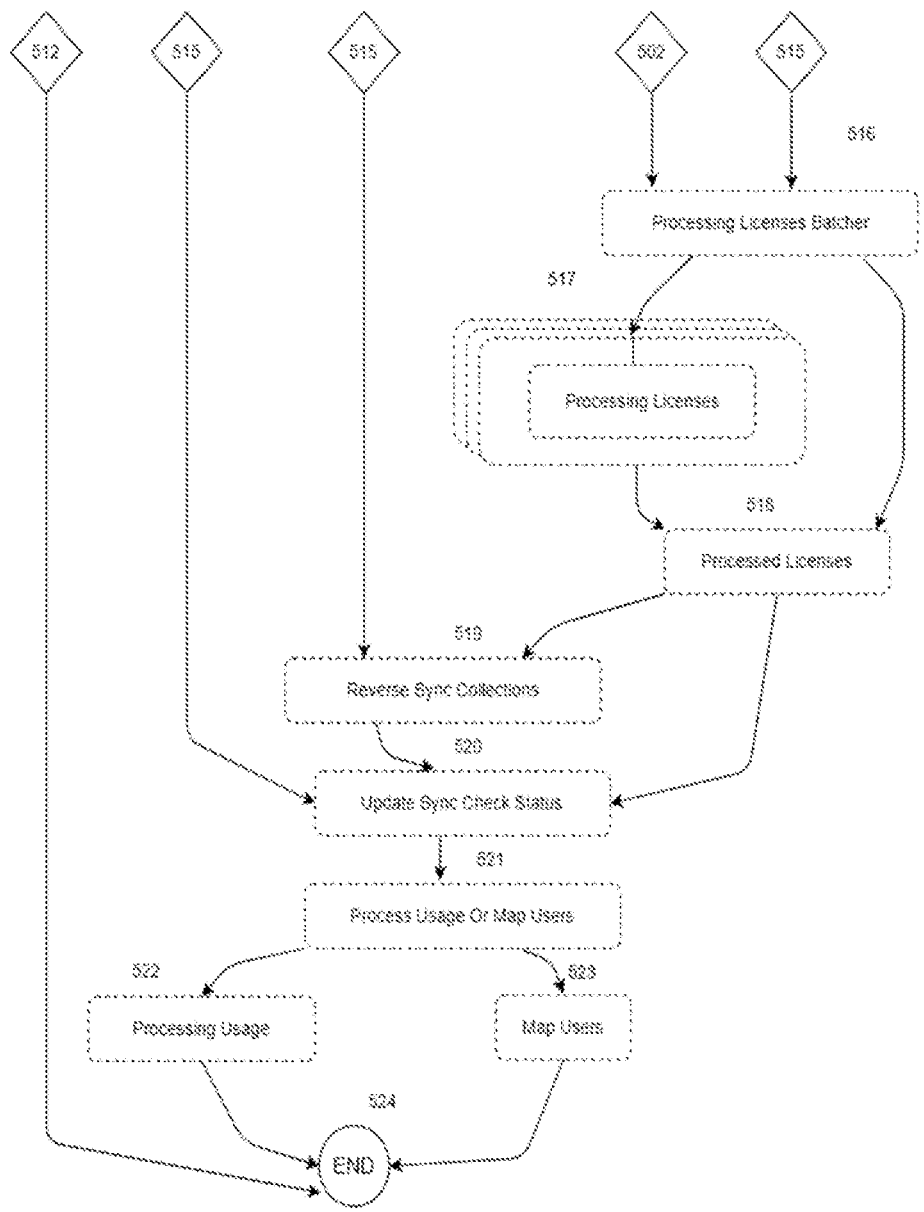

FIG. 5a-5c indicates a flow of information at different stages during the data processing operation 500. For example, in case of Slack® application, the data processing operation is explained through a flow chart of connected steps, as shown in FIGS. 5a, 5b, and 5c. As shown in FIG. 5a, the system starts the process at 501, and the next process or application to be processed is selected at 502. Further, the App Scheduler at 503 manages the execution and scheduling of various data processing tasks or applications within the pipeline. In one of the embodiments, the App scheduler may identify the number of sub-pipelines required to process the incoming data based on the available different data types for an application. In one of the embodiments, at process organization 504, the dependencies between different processing layers of each sub-pipeline may be identified to process the data. Alternatively, the system first analysis the task dependencies at process organization 504, followed by users on different sub-pipelines. The users are processed in batches through a process called Users Batcher at 505. The Users' data is processed at 506 in batches. The processed Users' data from 507 is fed to Activities Batcher 508 to process user activity data in batches. The activities are processed at 509, as shown in FIG. 5b. Further, in parallel, the user Groups' data is processed at 513, and user licenses data is also processed. The Reverse Sync process at 515 updates the source data based on the modifications or updates made in the processed data. Similarly, the Licenses Batcher is executed at 516 to process the user license data, and the processes licenses are obtained at 518 as shown in FIG. 5c. Subsequently, the Reverse Sync Collections at 519 synchronize entire collections of data rather than individual records. At 520, the Sync check status is updated by taking status directly from the Reverse sync block at 515 or from the processed licenses block at 518. In Reverse Sync Collections represents a group of related data entities or documents that are stored together. Furthermore, usage data is processed at 521, or users are mapped to respective processes at 521 in parallel. The usage is processed at 522 block and the users are mapped at 523, and the entire process is terminated at 524.

Exemplary embodiments discussed above may provide certain advantages. Though not required to practice aspects of the disclosure, these advantages may include those provided by the following features.

Some embodiments of the system and the method would help in optimizing the resource allocation while processing the data in a data processing pipeline.

Some embodiments of the system and the method would help in optimizing the time taken to process a certain amount of data obtained from a data source.

Some embodiments of the system and the method would help in saving costs for data processing by deploying targeted resources on targeted processing tasks.

Some of the system and method would help in building an agile system for data processing as it can be integrated easily and can be modified as per the business requirement.

Some of the system and method would help in building scalable data processing pipelines.

Some embodiments of the system and the method of the subject matter would help in building an adaptive application data processing pipeline that is generated on the fly rather than following a predefined template.

Although implementations for methods and system for dynamically generating a data processing pipeline have been described in language specific to structural features and/or methods, it is to be understood that the appended claims are not necessarily limited to the specific features or methods described. Rather, the specific features and methods are disclosed as examples of implementations for license optimization of a software application in an organization.

The invention claimed is:

1. A method for dynamically generating a data processing pipeline, the method comprising:
   receiving, by a processor, data including one or more data types from a data source;
   creating, by the processor, a set of sub-pipelines based on the one or more data types, wherein each sub-pipeline of the set of sub-pipelines includes one or more processing layers, wherein each processing layer of the one or more processing layers handles data processing and storage operations, and wherein creating the set of sub-pipelines comprises: identifying a dependency between the one or more processing layers of one or more sub-pipelines of the set of sub-pipelines, wherein the dependency indicates an order of execution of data processing at the one or more processing layers;
   determining, by the processor, the one or more data types and volume of data assigned to each processing layer of the one or more processing layers, wherein the one or more data types includes an application state data and a time interval-based application data;
   dynamically allocating resources, by the processor, to the one or more processing layers based on the data source, the volume of the data, the one or more data types, and a resource type which is one of a compute intensive resource and a memory intensive resource; and
   re-allocating, by the processor, the resources of the one or more processing layers to a subsequent processing layer based upon completion of the processing at the one or more processing layers.

2. The method as claimed in claim 1, wherein the order of execution of data processing at the one or more processing layers includes at least one of a serial processing, a parallel processing, or a combination of both.

3. The method as claimed in claim 1, wherein the dynamically allocating resources comprises determining the resource type, based on at least one of, the one or more data types, the data source, and the volume of data, wherein the resource type is determined based on a set of parameters comprising computational need, storage capacity, network performance, and latency considerations.

4. The method as claimed in claim 1, wherein the dynamically allocating resources comprises allocation of different resource type at different processing layers within a sub-pipeline of the set of sub-pipelines.

5. The method as claimed in claim 3, further comprising assigning the resource type based on one or more of a processor speed, number of Central Processing Unit (CPU) cores, Random Access memory (RAM) size, storage type, and size, cache size, and network bandwidth.

6. The method as claimed in claim 1, wherein the data is received from at least one of a Single Sign On (SSO) platform, application integration platform, and browser agent.

7. The method as claimed in claim 1, further comprising prior to receiving the data, accessing a configuration file for generating the data processing pipeline, the configuration file including information related to the data source, the one or more processing layers, and a dependency between one or more processing layers and error handling.

8. The method as claimed in claim 1, wherein the application state data comprises at least one of user session information, application configuration settings, workflow or process-related information, queues, users, and user messaging, and wherein the time interval-based application data comprises at least one of application event logs, and application time-series data, and streaming data.

9. The method as claimed in claim 1, comprises generating a validation script to validate one or more aspects of the data processing pipeline, wherein the one or more aspects include data input, data output, data processing steps, and performance of the data processing pipeline.

10. The method as claimed in claim 1, wherein the data processing pipeline includes a self-recovery mechanism, wherein the self-recovery mechanism restarts the data processing from the point where the data processing stopped after running into an error.

11. The method as claimed in claim 1, wherein allocation of resources occurs on the fly based on the one or more data types and volume of the data.

12. The method as claimed in claim 1, wherein the data is processed as a single indivisible task at the one or more processing layers.

13. The method as claimed in claim 1, wherein an auto scale function is used to manage the resources at different processing layers.

14. The method as claimed in claim 1, wherein the data processing pipeline includes an auto resume mechanism for error handling.

15. A system for dynamically generating a data processing pipeline, the system comprising:
  a memory; and
  a processor coupled to the memory, wherein the processor is configured to execute program instructions stored in the memory for:
    receiving data including one or more data types from a data source;
    creating a set of sub-pipelines based on the one or more data types, wherein each sub-pipeline of the set of sub-pipelines includes one or more processing layers, wherein each processing layer handles different data processing and storage operations, and wherein creating the set of sub-pipelines comprises: identifying a dependency between the one or more processing layers of one or more sub-pipelines of the set of sub-pipelines, wherein the dependency indicates an order of execution of data processing at the one or more processing layers;
    determining the one or more data types and volume of data assigned for processing to each processing layer of the one or more processing layers, wherein the one more data types includes an application state data and a time interval-based application data;
    dynamically allocating resources to the one or more processing layers based on the data source, the volume of the data, the one or more data types, and a resource type which is one of a compute intensive resource and a memory intensive resource; and
    re-allocating the resources of the one or more processing layers to a subsequent processing layer based upon completion of the processing at the one or more processing layers.

16. The system as claimed in claim 15, wherein creating the set of sub-pipelines comprises:
  identifying a dependency between the one or more processing layers of one or more sub-pipelines of the set of sub-pipelines; and
  assigning the one or more data types and volume of data for processing to each processing layer based on the dependency, wherein the dependency indicates an order of execution of the one more processing layers.

17. The system as claimed in claim 15, wherein the dynamically allocating resources comprises determining the resource type, based on at least one of, the one or more data types, the data source, and the volume of data, wherein the resource type is determined based on a set of parameters comprising computational need, storage capacity, network performance, and latency considerations.

18. The system as claimed in claim 17, further comprises assigning different resource types to a processing layer of the one or more processing layers.

19. A non-transitory computer program product having embodied thereon a computer program for dynamically generating a data processing pipeline, the computer program product storing instructions, which when executed by a processor, for:
  receiving data including one or more data types from a data source;
  creating a set of sub-pipelines based on the one or more data types, wherein each sub-pipeline of the set of sub-pipelines includes one or more processing layers, wherein each processing layer handles different data processing and storage operations, and wherein creating the set of sub-pipelines comprises: identifying a dependency between the one or more processing layers of one or more sub-pipelines of the set of sub-pipelines, wherein the dependency indicates an order of execution of data processing at the one or more processing layers;
  determining the one or more data types and volume of data assigned to each processing layer of the one or more processing layers, wherein the one more data types includes an application state data and a time interval-based application data;
  dynamically allocating resources to the one or more processing layers based on the data source, the volume of the data, the one or more data types, and a resource type which is one of a compute intensive resource and a memory intensive resource; and re-allocating the resources of the one or more processing layers to a subsequent processing layer based upon completion of the processing at the one or more processing layers.

* * * * *